May 5, 1931.  G. W. DOOLEY  1,803,932
HYDRAULIC MECHANISM FOR DRIVING MOTOR VEHICLES
Filed July 12, 1927
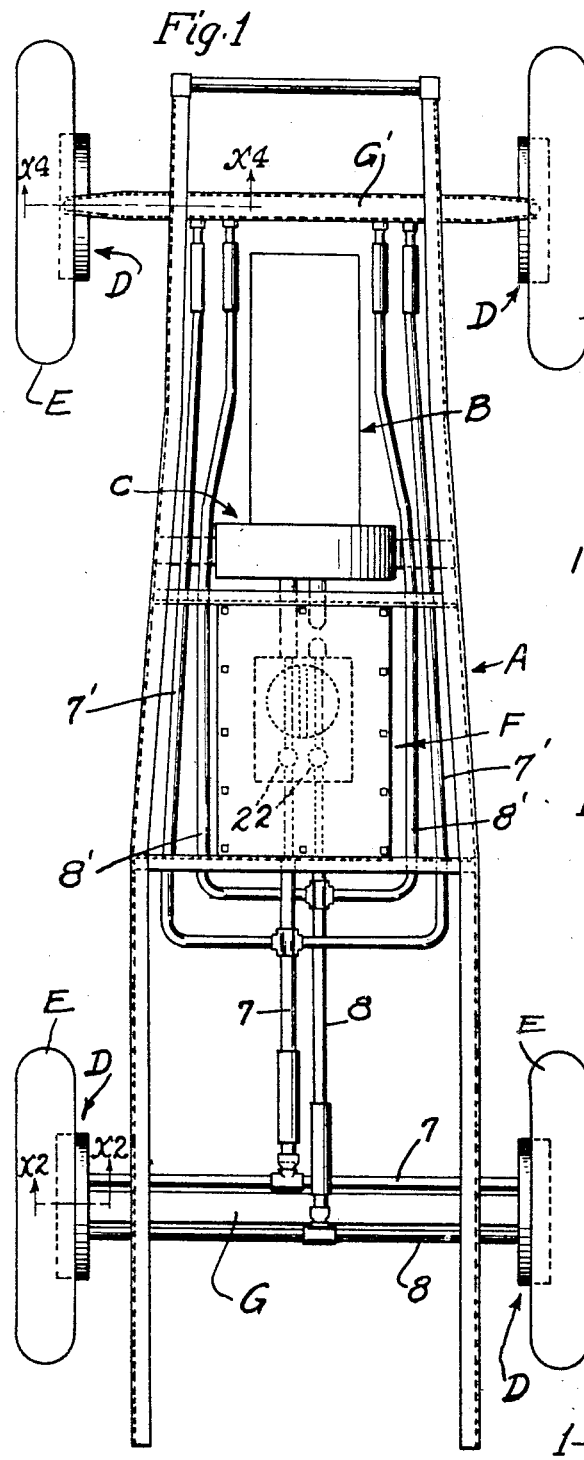
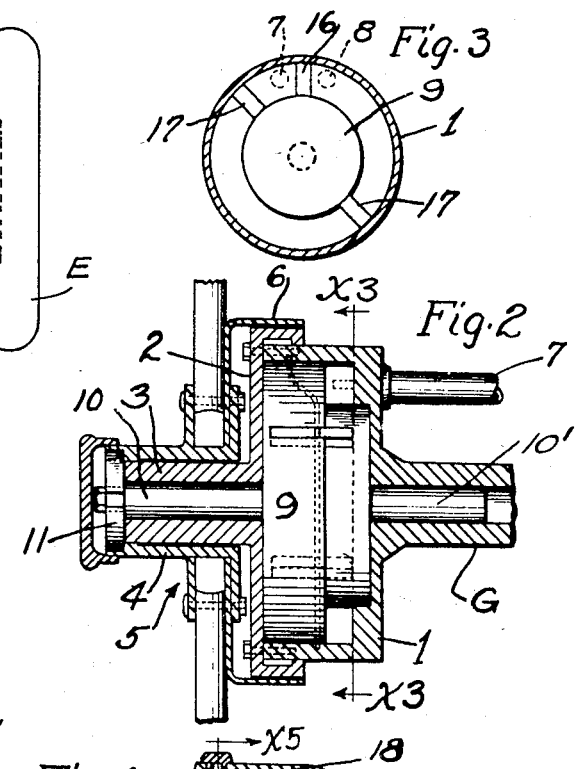
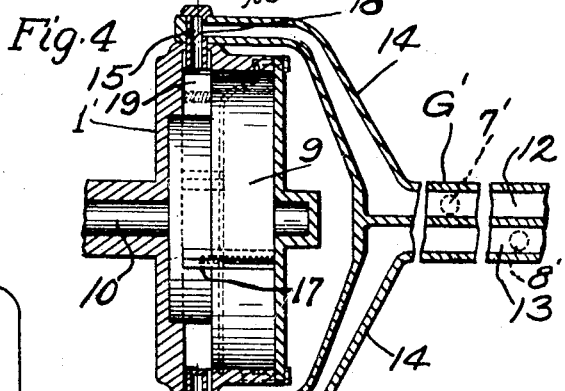
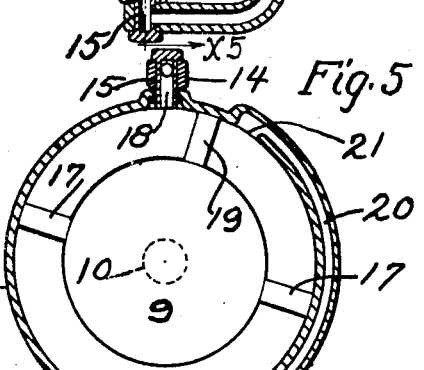
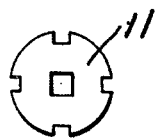
WITNESS
Rob't S. Woolsey
INVENTOR
GEORGE W. DOOLEY
James R. Townsend Patented May 5, 1931

1,803,932

UNITED STATES PATENT OFFICE

GEORGE W. DOOLEY, OF DUCOR, CALIFORNIA

HYDRAULIC MECHANISM FOR DRIVING MOTOR VEHICLES

Application filed July 12, 1927. Serial No. 205,236.

The present invention embodies the novel features and combination of parts to form a convenient means of driving and braking the wheels of a hydraulically driven motor vehicle.

One of the objects of the invention is to get the driven pumps, or motors, as near the wheels as practical, thus eliminating long drive shafts and axles and eliminating the gearing that is necessary in the ordinary mechanical drive.

It will be readily apparent that by having the pipes, or passages, leading from the source of supply to the driven wheels, practically the same size and length, the force exerted to all wheels will be approximately the same, and that while one or more wheels are wont to turn faster than the others (as in turning a corner), they may do so.

The object of the hollow axle-tree, is to furnish a convenient means of piping to the pumps, or motors, thereby eliminating the necessity of hose or flexible piping near the wheels.

The advantage of combining two pumps, or motors, with a rear axle housing, is, that the pumps are held securely in place and alinement, and that this method of driving the rear wheels does not require any differential gearing, also it gives a better road clearance between the wheels, and by having the wheels turning on a spindle that is a part of, or attached to, the axle-housing, they may be driven without being rigid with the pump rotor shaft.

Figure 1 is a plan view of an automobile chassis equipped with a four wheel driving mechanism constructed in accordance with my invention.

Fig. 2 is an enlarged vertical section on line x2, Fig. 1, showing one of the rear wheel motors, fragments only of the wheel and axle being shown.

Fig. 3 is a diagrammatical section on line x3, Fig. 2, showing the abutment as related to the inlet and exhaust.

Fig. 4 is an enlarged, vertical section on line x4, Fig. 1 showing one of the front wheel motors, a fragment only of the axle shown and the wheel omitted.

Fig. 5 is a diagrammatical section on line x5, Fig. 4 showing diametrically opposed inlet and outlet and an abutment and by-pass providing full vane action.

Fig. 6 is a face view of a disc for making a driving connection between the motor shaft and wheel hub.

A designates the chassis of an automobile and B the engine or motive power plant therefor, both of which may be of conventional construction. The driving mechanism of my invention comprises a pump C, driven by the engine B, motors D for each of the traction wheels E and a control F between the pump and motors. The motors may be of the type shown and described in my copending application, Serial No. 198,784, filed June 14, 1927.

As shown, each motor is directly carried upon an axle tree G and G', and the motor shells or stators 1 of the rear axles G are shown formed as integral parts of the axles, and the stators or shells 1' of the front axle G' are pivotally connected to the axle for steering purposes.

The stator heads or end plates 2 of the rear motors D are, as shown, of larger diameter than the shells 1 for the support of manually operated brake rigging, not shown, and are provided with tubular spindles 3 that are supported by the hubs 4 of the rear wheels 5, which carry the brake drums 6.

Inlet and outlet pipes 7 and 8 connect the control F with the interior of the stators.

Rotors, each provided on one side with a journal shaft 10' and on the other side with a drive shaft 10, are revolvably mounted in the stators, and the drive shafts 10 are integrally connected with the hubs 4 of the traction wheels respectively, as by collars 11 as indicated in Figs. 2 and 6, so that rotation of the rotors is transmitted to the traction wheels.

The front axle G' is formed hollow and partitioned to form distinct passages 12 and 13, and the axle at each end carries a yoke, the branches 14 of which are hollow and which support the stators as by hollow pivots 15, whereby the stators carrying the wheels may serve as the conventional steering knuckles. From the inlet pipe of the rear axle a branch pipe 7' leads to the inlet passage 12 of the front axle and similarly from the outlet pipe 8, a branch pipe 8' leads to the outlet passage 13 of the front axle.

As best shown in Fig. 3, the inlet and outlet of each rear motor are located bodily above the axle to provide maximum ground clearance and bear relatively close approximation so that by placing the abutment 16 between them there may be maximum length of power stroke for the vanes or blades 17 of the rotor.

In Figs. 4 and 5 showing the front axle as serving to directly conduct fluid motive power to the motors, and by reason of the mechanical connections between the axle and motor located substantially diametrically opposed, the inlet 18 being the hollow pivot at the upper branch of the yoke opens directly into the stator in the path of the vanes of the rotor and the abutment 19 is fixed adjacent the inlet. In order to obtain a full power stroke of the vanes I provide a by-pass 20, the intake 21 of which opens to the stator immediately adjacent the abutment opposite the inlet 18, and the discharge end of which communicates with the lower branch of the yoke and the outlet passage of the axle through the lower hollow pivot 15, and which pivot is closed against communication with the stator. Thus the vanes have a full power stroke between the hollow pivot at the top of the motor and the intake 21 of the by-pass of the motor.

It will be readily seen that the motors shown herein are simply rotary pumps and will function as such when the motor vehicle is coasting, but will act as motors when the liquid is forced through them. They will also act as brakes when they are pumping and the discharge is pinched, or closed, by means of a valve, or valves 22 of the control F.

It is obvious that changes may be made in the construction and arrangement of the parts herein shown without departing from the scope, or spirit, of my invention, I therefore do not desire to be limited to the exact construction and form herein shown.

Having thus described my invention, I claim as new and desire to secure by Letters Patent:

In a driving mechanism for vehicles, a tractor wheel, a stator having a hollow spindle and fixed to a shaft; a rotor in the stator and provided with a drive shaft extending through the spindle; a collar fixed on the end of the drive shaft and non-rotatably connecting such drive shaft with the traction wheel; said stator being fixed to the axle and comprising a shell having a shaft coaxial with the drive shaft and journalled in the axle.

In testimony whereof, I affix my signature.
GEORGE W. DOOLEY.